United States Patent
McGuire et al.

(10) Patent No.: US 10,008,034 B2
(45) Date of Patent: *Jun. 26, 2018

(54) SYSTEM, METHOD, AND COMPUTER PROGRAM PRODUCT FOR COMPUTING INDIRECT LIGHTING IN A CLOUD NETWORK

(71) Applicant: NVIDIA Corporation, Santa Clara, CA (US)

(72) Inventors: Morgan McGuire, Williamstown, MA (US); Cyril Jean-Francois Crassin, Paris (FR); David Patrick Luebke, Charlottesville, VA (US); Michael Thomas Mara, Williamstown, MA (US); Brent L. Oster, San Jose, CA (US); Peter Schuyler Shirley, Salt Lake City, UT (US); Peter-Pike J. Sloan, Sammamish, WA (US); Christopher Ryan Wyman, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 14/058,132

(22) Filed: Oct. 18, 2013

(65) Prior Publication Data

US 2014/0327690 A1 Nov. 6, 2014

Related U.S. Application Data

(60) Provisional application No. 61/819,330, filed on May 3, 2013.

(51) Int. Cl.
*G06T 15/50* (2011.01)
*G06T 15/55* (2011.01)
(Continued)

(52) U.S. Cl.
CPC ............ *G06T 15/55* (2013.01); *A63F 13/355* (2014.09); *G06T 15/005* (2013.01)

(58) Field of Classification Search
CPC ...................................................... A63F 13/355
(Continued)

(56) References Cited

U.S. PATENT DOCUMENTS 6,567,083 B1 * 5/2003 Baum .................. G06T 15/506
345/426
8,147,339 B1 * 4/2012 Perry .................... A63F 13/355
463/31

(Continued)

OTHER PUBLICATIONS

Combining Dynamic Simulation, High Dynamic Range Photography and Global Illumination, Waggoner et al., 1998.*
(Continued)

*Primary Examiner* — Barry Drennan
*Assistant Examiner* — Phong Nguyen
(74) *Attorney, Agent, or Firm* — Zilka-Kotab, PC

(57) ABSTRACT

A system, method, and computer program product are provided for computing indirect lighting in a cloud network. In operation, one or more scenes for rendering are identified. Further, indirect lighting associated with the one or more scenes is identified. Additionally, computation associated with the indirect lighting is performed in a cloud network utilizing at least one of a voxel-based algorithm, a photon-based algorithm, or an irradiance-map-based algorithm.

7 Claims, 11 Drawing Sheets

(51) Int. Cl.
G06T 15/00 (2011.01)
A63F 13/355 (2014.01)

(58) Field of Classification Search
USPC .......................................................... 345/426
See application file for complete search history.

(56) References Cited

U.S. PATENT DOCUMENTS

| | | | | |
|---|---|---|---|---|
| 2006/0066616 | A1* | 3/2006 | Sevastianov | G06T 15/06 345/426 |
| 2008/0207322 | A1* | 8/2008 | Mizrahi | A63F 13/12 463/32 |
| 2009/0254293 | A1* | 10/2009 | Tartaglia et al. | 702/85 |
| 2010/0033493 | A1* | 2/2010 | Nutter | G06T 15/06 345/589 |
| 2011/0012901 | A1* | 1/2011 | Kaplanyan | G06T 15/506 345/426 |
| 2011/0043523 | A1* | 2/2011 | Kim | G06T 15/005 345/426 |
| 2012/0212491 | A1* | 8/2012 | Hager | G06T 15/04 345/426 |
| 2012/0313944 | A1* | 12/2012 | Kontkanen | G06T 1/60 345/426 |
| 2013/0038618 | A1* | 2/2013 | Urbach | 345/522 |
| 2013/0113800 | A1* | 5/2013 | McCombe et al. | 345/424 |
| 2013/0120385 | A1* | 5/2013 | Krishnaswamy | G06T 15/50 345/426 |
| 2013/0137511 | A1* | 5/2013 | Bae | G07F 17/3225 463/29 |
| 2013/0335434 | A1* | 12/2013 | Wang | G06N 99/005 345/581 |
| 2014/0035900 | A1* | 2/2014 | Slavin, III | G06T 15/20 345/419 |
| 2014/0173674 | A1* | 6/2014 | Wolman | H04N 21/25 725/116 |
| 2014/0267271 | A1* | 9/2014 | Billeter | G06T 15/005 345/426 |
| 2014/0285499 | A1* | 9/2014 | Iwasaki | G06T 15/005 345/502 |

OTHER PUBLICATIONS

Global Illumination using Photon Maps, Jensen, 1996.*
Pacanowski et al., "Efficient Streaming of 3D Scenes with Complex Geometry and Complex Lighting", 2008, Web3D '08 Proceedings of the 13th international symposium on 3D web technology, pp. 11-17.*
Meneveaux et al., "Photon Streaming for Interactive Global Illumination in Dynamic Scenes", 2008, https://hal.archives-ouvertes.fr/hal-00331236, pp. 1-16.*
Waters, "Photon Mapping", 2006, https://web.cs.wpi.edu/~emmanuel/courses/cs563/write_ups/zackw/photon_mapping/PhotonMapping.html, pp. 1-8.*
Ramamoorthi, "An Efficient Representation for Irradiance Environment Maps", 2001, SIGGRAPH '01 Proceedings of the 28th annual conference on Computer graphics and interactive techniques, pp. 497-500.*
Wyman et al., "Interactive Display of Isosurfaces with Global Illumination", 2004, IEEE Transactions on Visualization and Computer Graphics , vol. 12, Issue: 2, pp. 1-9.*
Klionsky, "A New Architecture for Cloud Rendering and Amortized Graphics", 2011, School of Computer Science, Computer Science Department, Carnegie Mellon University, pp. 1-39.*
Loos, et al., "Volumetric Obscurance," Proceedings of the 2010 ACM SIGGRAPH Symposium on Interactive 3D Graphics and Games, ACM, Feb. 2010, pp. 151-156.
McGuire, M., "Ambient Occlusion Volumes," Proceedings of the Conference on High Performance Graphics, Eurographics Association, Jun. 2010, pp. 47-56.

McGuire, et al., "The Alchemy Screen-Space Ambient Obscurance Algorithm," Proceedings of the ACM SIGGRAPH Symposium on High Performance Graphics, ACM, Aug. 2011, pp. 25-32.
McTaggart, G., "Half-life 2 / Valve Source Shading," Direct3D Tutorial Day, Game Developers Conference, Valve Corporation, Mar. 22, 2004, 97 slides, retrieved from http://www.valvesoftware.com/publications/2004/GDC2004_Half-Life2_Shading.pdf.
Miller, et al., "Illumination and Reflection Maps: Simulated Objects in Simulated and Real Environments," SIGGRAPH 84, Course Notes for Advanced Computer Graphics Animation, Jul. 23, 1984, pp. 1-12.
Mittring, M., "Finding next gen: CryEngine 2," Advanced Real-Time Rendering in 3D Graphics and Games Course—SIGGRAPH 2007, Aug. 2007, CRYTEK, Chapter 8, pp. 97-121.
McGuire, et al., "Scalable Ambient Obscurance," Proceedings of the Fourth ACM SIGGRAPH/ Eurographics Conference on High-Performance Graphics, Eurographics Association, Jun. 2012, pp. 97-103.
Nicodemus, et al., "Geometrical Considerations and Nomenclature for Reflectance," Institute for Basic Standards, National Bureau of Standards, U.S. Dept of Commerce, Issued Oct. 1977, 67 pages.
Noguera, et al., "Navigating large terrains using commodity mobile devices," Computers and Geosciences, vol. 37, No. 9, Sep. 2011, pp. 1218-1233.
"GPU Gems 2: Programming Techniques for High-Performance Graphics and General-Purpose Computation (Gpu Gems)," Addison-Wesley Professional, Apr. 2005, can be retrieved at http://http.developer.nvidia.com/GPUGems2/gpugems2_part01.html.
Ramamoorthi, et al., "An Efficient Representation for Irradiance Environment Maps," ACM SIGGRAPH, Aug. 12-17, 2001, pp. 497-500.
Rose, M., "OnLive Works With Game Devs on Newly-Launched Tablet, Smartphone Initiative," Dec. 8, 2011, p. 1, retrieved at http://www.gamasutra.com/view/news/128588/OnLive_Works_With_Game_Devs_On-_NewlyLaunched_Tablet_Smartphone_Initiative.php.
Shanmugam, et al., "Hardware Accelerated Ambient Occlusion Techniques on GPUs," Proceedings of the 2007 Symposium on Interactive 3D Graphics and Games I3D, Apr. 2007, pp. 73-80.
Sloan, P.P., "Stupid Spherical Harmonics (sh) Tricks," Game Developers Conference, vol. 9, Feb. 2008, 42 pages.
Smith, A. R., "The viewing transformation," Technical Memo 84, Jun. 24, 1983, 27 pages.
Laszlo et al., "Volumetric Ambient Occlusion for Real-Time Rendering and Games," IEEE Computer Graphics and Applications, Jan. 2010, pp. 70-79.
Scheuermann, et al., "Cubemap Filtering with CubeMapGen," ATI: 3D Application Research Group, Game Developers Conference Talk, 2005, 27 slides.
Upchurch, et al., "Tightening the Precision of Perspective Rendering," (to appear in the Journal of Graphics Tools, vol. 16, Issue 1, 2012, pp. 40-56), pp. 1-6.
Veach, et al., "Metropolis Light Transport," Aug. 1997, pp. 65-76.
Williams, L., "Casting Curved Shadows on Curved Surfaces," ACM SIGGRAPH Computer Graphics, vol. 12, Issue 3, Aug. 1978, pp. 270-274.
Foley, J. D. et al., "A Tutorial on Satellite Graphics Systems," Computer, Aug. 1976, pp. 14-21.
Armbrust, et al., "A view of cloud computing," Communications of the ACM, vol. 53, No. 4, Apr. 2010, pp. 50-58.
Boukerche, et al., "Remote rendering and streaming of progressive panoramas for mobile devices," Proceedings of the 14th Annual ACM International Conference on Multimedia, Oct. 23-27, 2006, pp. 691-694.
Boulton, M., "Static lighting tricks in Halo 4," GDC Presentation, 2013, 17 slides.
Brodlie, et al., "Distributed and Collaborative Visualization," EUROGRAPHICS 2003, State of the Art Report (STAR), 2004, pp. 1-28.
Chalmers, A. et al., "Practical Parallel Rendering," A K Peters, 2002, pp. v-xiii and 3-370.

(56) References Cited

OTHER PUBLICATIONS

Chang, et al., "Practical Strategies for Power-Efficient Computing Technologies," Proceedings of the IEEE, vol. 98, No. 2, Feb. 2010, pp. 215-236.
Chen, et al., "Measuring the Latency of Cloud Gaming Systems," In Proceedings of the 19th ACM International Conference on Multimedia, ACM, Nov. 28-Dec. 1, 2011, pp. 1269-1272.
Choy, et al., "The Brewing Storm in Cloud Gaming: A Measurement Study on Cloud to End-User Latency," NetGames 2012: The 11th ACM Annual Workshop on Network and Systems Support for Games, Nov. 2012, pp. 1-7.
Cohen, et al., "A progressive refinement approach to fast radiosity image generation," In ACM SIGGRAPH Computer Graphics, vol. 22, No. 4, Aug. 1988, pp. 75-84.
Crassin, et al., "Interactive Indirect Illumination Using Voxel Cone Tracing," Computer Graphics Forum, Wiley-Blackwell, vol. 30, No. 7, Sep. 2011, pp. 1921-1930.
Crassin, et al., "CloudLight: A system for amortizing indirect lighting in real-time rendering," NVIDIA Technical Report NVR-2013-001, Jul. 2013, pp. 1-10.
Dutre, et al., "Advanced Global Illumination," SIGGRAPH 2002 Course 2 (Half Day), 2002, pp. 1-25.
Hu, et al., "Visual Cues for Imminent Object Contact in Realistic Virtual Environment," In Proceedings of the Conference on Visualization '00, IEEE Computer Society Press, Oct. 2000, pp. 179-185.
Jensen, H. W., "Realistic Image Synthesis Using Photon Mapping," A. K. Peters, Ltd., 2001, pp. 1-181.
Karapantazis, et al., "VoIP: A comprehensive survey on a promising technology," Computer Networks, vol. 53, 2009, pp. 2050-2090.
Koller, et al., "Protected interactive 3D graphics via remote rendering," ACM Transactions on Graphics (TOG), Aug. 2004, vol. 23, No. 3, pp. 695-703.
Lawton, G., "Cloud Streaming Brings Video to Mobile Devices," Computer, vol. 45, Issue 2, Feb. 2012, pp. 14-16.
Loos, et al., "Modular radiance transfer," ACM Transactions on Graphics (TOG), Proceedings of ACM SIGGRAPH Asia 2011, vol. 30, No. 6, Dec. 2011, Article No. 178, pp. 1-10.
Luke, et al., "Semotus Visum: A Flexible Remote Visualization Framework," IEEE Visualization, Oct. 27-Nov. 1, 2002, pp. 61-68.
Manzano, M., "An empirical study of Cloud Gaming," Annual Workshop on Network and Systems Support for Games, Nov. 22-23, 2012, pp. 1-2.
Mara, M. "Cloudlight: A Distributed Global Illumination System for Real-Time Rendering," Thesis, May 13, 2012, pp. 1-62.
Mara, et al., "Toward practical real-time photon mapping: efficient GPU density estimation," Proceedings of the ACM SIGGRAPH Symposium on Interactive 3D Graphics and Games, ACM, Mar. 2013, pp. 71-78.
Martin, S., Geomerics, Electronic Arts (EA) DICE, "A Real-Time Radiosity Architecture for Video Games," SIGGRAPH 2010 Courses, Slideshow, Aug. 1, 2010, 37 slides.
Mitchell, et al., "Shading in Valve's Source Engine," Advanced Real-Time Rendering in 3D Graphics and Games Course—ACM SIGGRAPH 2006, Chapter 8, pp. 8-1-8-14.
Parker, et al., "OptiX: A General Purpose Ray Tracing Engine," ACM Transactions on Graphics, vol. 29, No. 4, Article No. 66, Jul. 2010, 66:1-66:13.
Paul, et al., "Chromium renderserver: Scalable and open remote rendering infrastructure," Visualization and Computer Graphics, IEEE Transactions, vol. 14, Issue 3, Jun. 3, 2008, pp. 627-639.
Ritschel, et al., "The State of the Art in Interactive Global Illumination," Computer Graphics forum, Blackwell Publishing Ltd., vol. 0, No. 0, 1981, pp. 1-27.
Rao, et al., "Network characteristics of video streaming traffic," CoNEXT '11, Dec. 6-9, 2011, pp. 1-12.
Shi, et al., "A Real-Time Remote Rendering System for Interactive Mobile Graphics," ACM Transactions on Multimedia Computing, Communications and Applications, vol. 8, No. 3s, Article 46, Sep. 2012, pp. 46:1-46:20.
Sinha, P., "Recovering reflectance and illumination in a world of painted polyhedra," Fourth International Conference on Computer Vision, May 11-14, 1993, pp. 156-163.
Suznjevic et al., "MMORPG player actions: Network performance, session patterns and latency requirements analysis," Multimedia Tools and Applications, vol. 45, No. 1-3, Oct. 2009, pp. 191-214.
Tamm, et al., "Hybrid Distributed Rendering," IEEE LDAV Symposium 2012, pp. 1-2.
Whitted, T., "An improved illumination model for shaded display," ACM SIGGRAPH Computer Graphics, vol. 13, Issue 2, Aug. 1979, pp. 1-6.
Akeley et al., "Minimum triangle Separation for Correct Z-Buffer Occlusion," Graphics Hardware, Eurographics Association, 2006, pp. 27-30.
Akenine-Moller, T. et al., "Real-time rendering," 3rd Edition, A. K. Peters, Ltd., 2008, pp. 1-1027.
Arikan, O. et al., "Fast and detailed approximate global illumination by irradiance decomposition," Computer Graphics Proceedings, Annual Conference Series, 2005, pp. 1108-1114.
Bavoil et al., "Multi-Layer Dual-Resolution Screen-Space Ambient Occlusion," SIGGRAPH 2009 Talks, Article 45, Aug. 2009, p. 1.
Blinn, et al., "Texture and reflection in computer generated images," Graphics Image Processing, Communications of the ACM, vol. 19, No. 10, Oct. 1976, pp. 542-547.
Filion, et al., "Effects & Techniques," STARCRAFT, Advances in Real-Time Rendering in 3D Graphics and Games Course, SIGGRAPH 2008 Games, Aug. 2008, Chapter 5, pp. 133-164.
Green, et al., "Efficient Self-Shadowed Radiosity Normal Mapping," Vlave, 2007, pp. 1-4.
Greene, N., "Environment Mapping and Other Applications of World Projections," Computer Graphics and Applications, IEEE, vol. 6, No. 11, Nov. 1986, pp. 21-29.
Hoang et al., "Efficient screen-space approach to high-quality multiscale ambient occlusion," The Visual Computer: International Journal of Computer Graphics, vol. 28, Issue 3, Mar. 2012, pp. 289-304.
Immel, et al., "A Radiosity Method for Non-Diffuse Environments," ACM SIGGRAPH Computer Graphics, vol. 20, No. 4, Aug. 18-22, 1986, pp. 133-142.
Jensen, "Global Illumination Using Photon Maps," (Extended Version of the Paper in Proceedings of the Seventh Eurographics Workshop on Rendering, 1996, pp. 21-30), pp. 1-17.
Kajiya, J.T., "The Rendering Equation," ACM SIGGRAPH Computer Graphics, vol. 20, No. 4, Aug. 18-22, 1986, pp. 143-150.
Kaplanyan, A., "CryENGINE 3: Reaching the speed of light," SIGGRAPH 2010 Courses, Los Angeles, CA, ACM, Sep. 17, 2010, 99 slides.
King, G., "Real-Time Computation of Dynamic Irradiance Environment Maps," GPU Gems 2, Apr. 2005, pp. 1-14, retrieved from http.developer.nvidia.com/GPUGems2/gpugems2_chapter10.html.
Lafortune, E., "Mathematical Models and Monte Carlo Algorithms for Physically Based Rendering," Department of Computer Science, Faculty of Engineering, Katholieke Universiteit Leuven, 1996, pp. 1-142.
Lapidous et al., "Optimal Depth Buffer for Low-Cost Graphics Hardware," EUROGRAPHICS, 1999, pp. 67-73.
Levoy, M., "Polygon-Assisted JPEG and MPEG Compression of Synthetic Images," Proceedings of the 22nd Annual Conference on Computer Graphics and Interactive Techniques (New York, NY, USA), SIGGRAPH '95, ACM, Sep. 1995, pp. 21-28.
Non-Final Office Action from U.S. Appl. No. 14/270,252, dated Sep. 24, 2015.
Pacanowski, R. et aL, "Efficient Streaming of 3D Scenes with Complex Geometry and Complex Lighting," 2008, pp. 1-7.
Christensen, P. H. et al., "An Irradiance Atlas for Global Illumination in Complex Production Scenes," Eurographics Symposium on Rendering, 2004, pp. 1-10.

* cited by examiner

SYSTEM, METHOD, AND COMPUTER PROGRAM PRODUCT FOR COMPUTING INDIRECT LIGHTING IN A CLOUD NETWORK

CLAIM OF PRIORITY

This application claims the benefit of U.S. Provisional Application No. 61/819,330, filed May 3, 2013, the entire contents of which are incorporated herein by reference.

FIELD OF THE INVENTION

The present invention relates to rendering scenes, and more particularly to efficiently computing lighting associated with such scenes.

BACKGROUND

Most computer games and other three-dimensional interactive programs have direct lighting that comes directly from a light source to a viewed surface, which can also produce the familiar shadows when the light is blocked. Some advanced video games also include indirect light (sometimes called bounce light), where the light bounces off another surface and illuminates the point being viewed. The reflected light on the bottom of a person's chin when the sun is above is an example of indirect light. The computation of indirect light is generally too expensive for computationally less powerful devices such as phones, tablets, and weaker computers. Thus, there is a need for addressing this issue and/or other issues associated with the prior art.

SUMMARY

A system, method, and computer program product are provided for computing indirect lighting in a cloud network. In operation, one or more scenes for rendering are identified. Further, indirect lighting associated with the one or more scenes is identified. Additionally, computation associated with the indirect lighting is performed in a cloud network utilizing at least one of a voxel-based algorithm, a photon-based algorithm, or an irradiance-map-based algorithm.

DETAILED DESCRIPTION

Figure 1:
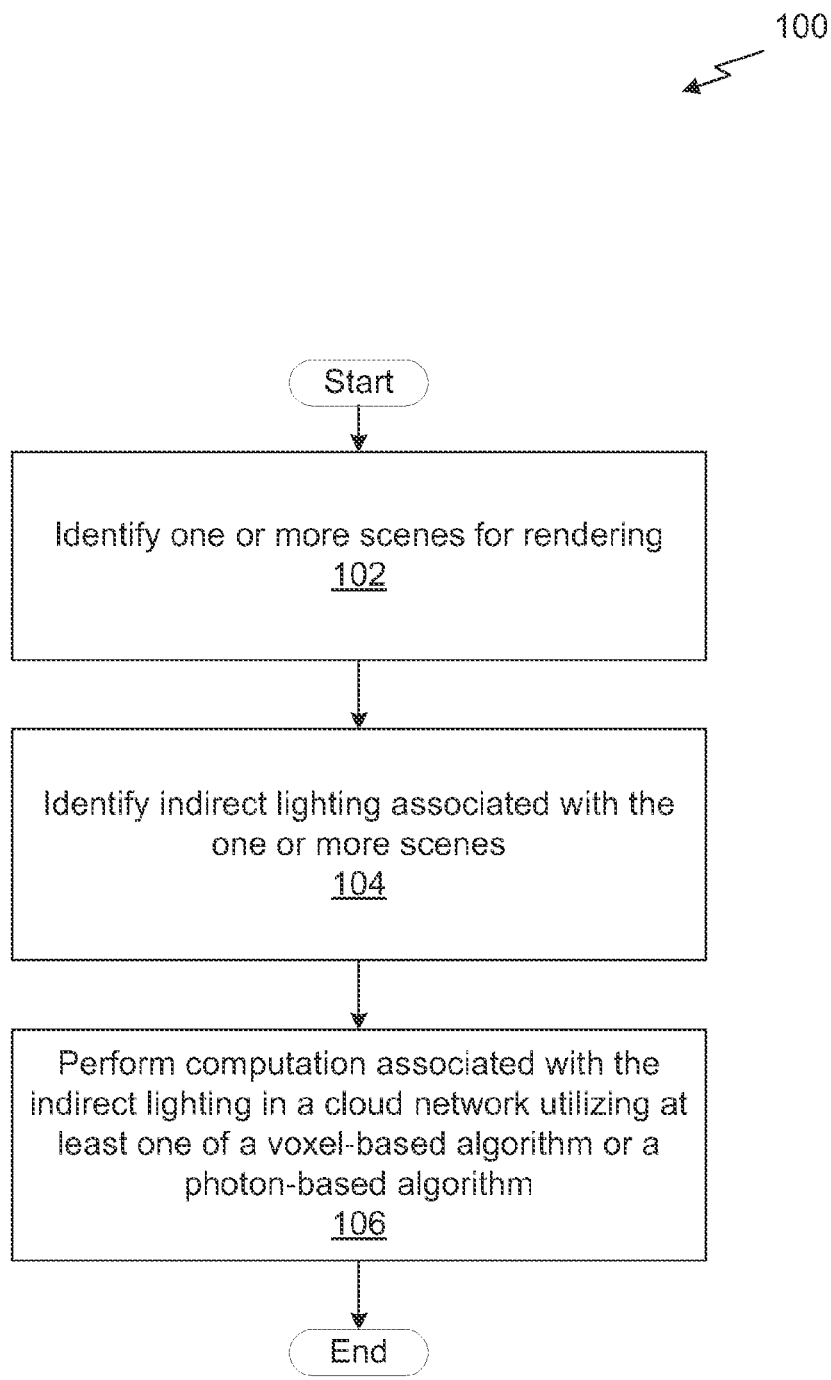
FIG. 1 illustrates a flowchart of a method for computing indirect lighting in a cloud network, in accordance with one embodiment.

FIG. 1 illustrates a flowchart of a method 100 for computing indirect lighting in a cloud network, in accordance with one embodiment. As shown in operation 102, one or more scenes for rendering are identified. Further, indirect lighting associated with the one or more scenes is identified, as shown in operation 104. Additionally, in operation 106, a computation associated with the indirect lighting is performed in a cloud network utilizing at least one of a voxel-based algorithm, a photon-based algorithm, or an irradiance-map based algorithm.

In the context of the present description, a cloud network refers to any server or collection of servers combined with some measure of reliability and transparency, allowing a view of computation much like a utility. In various embodiments, the servers may include local servers and/or remote servers. Further, indirect lighting refers to light that bounces off a surface and illuminates a point being viewed. On the other hand, direct lighting refers to light that comes directly from a light source to a viewed surface (e.g. which can also produce the familiar shadows when the light is blocked, etc.).

The indirect lighting may be identified and/or computed utilizing a variety of techniques and/or algorithms. For example, in one embodiment, identifying and computing the indirect lighting may include utilizing a voxel-based algorithm that includes storing indirect light in a three-dimensional volume as voxels, e.g. represented in a three-dimensional lattice. In this case, in one embodiment, performing the computation associated with the indirect lighting may include streaming voxel blocks to reduce latency.

In another embodiment, identifying and computing the indirect lighting may include utilizing at least one lightmap that stores radiosity, irradiance, incident radiance, or some other illumination quantity in buffers mapped over surfaces by an explicit parameterization. In this case, in one embodiment, indirect light may be stored as textures. Additionally, in one embodiment, performing the computation associated with the indirect lighting may include streaming lightmaps encoded as video (e.g. H.264 video, etc.).

Still yet, in one embodiment, identifying and computing the indirect lighting may include utilizing light probes. In the context of the present description, a light probe refers to an omnidirectional image of the scene from a specific viewpoint (e.g. a completely enclosing panorama, etc.). In various embodiments, these may be in a regular grid, with depth maps for assisting in selecting which are visible, manually placed, or with some other strategy for resolving visibility.

In another embodiment, identifying and computing the indirect lighting may include propagating photons. In this case, in one embodiment, the indirect light may be stored as three-dimensional points. Further, in one embodiment, performing the computation associated with the indirect lighting may include streaming batches of photons to reduce latency and improve efficiency of photon processing.

In one embodiment, light probes may be utilized as a targeted indirect light representation specifically for fast-moving objects. For example, in various embodiments, light probes for fast-moving objects may be utilized in conjunction with a voxel-based implementation, a lightmap-based implementation, and/or a photon-based implementation.

In one embodiment, indirect lighting that is shared between multiple devices may be computed on a single shared server. Furthermore, in one embodiment, indirect lighting that is shared between client devices may be computed on a shared GPU. In this case, each client may have associated client-specific direct lighting computed on the cloud network, and final computed images may be sent as encoded video. In this way, the shared indirect light computation may be amortized. Further, in one embodiment, the client may compute its own direct lighting and combine it with indirect lighting received from the cloud (e.g. utilizing photons and/or lightmaps, etc.).

The client devices may include any type of device, such as a mobile phone, a tablet computer, a laptop computer, a desktop computer, a gaming device, and/or any other type of computing device. In either case, the indirect lighting associated with the one or more scenes may be computed in the cloud network and computed data may be sent to a client to be used for better quality rendering than the client could compute outside the cloud.

In one embodiment, the method 100 may further include storing a result of the computation such that the computation may be computed once and is capable being utilized multiple times. Further, in one embodiment, performing the computation associated with the indirect in the cloud network may include performing the computation asynchronously.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
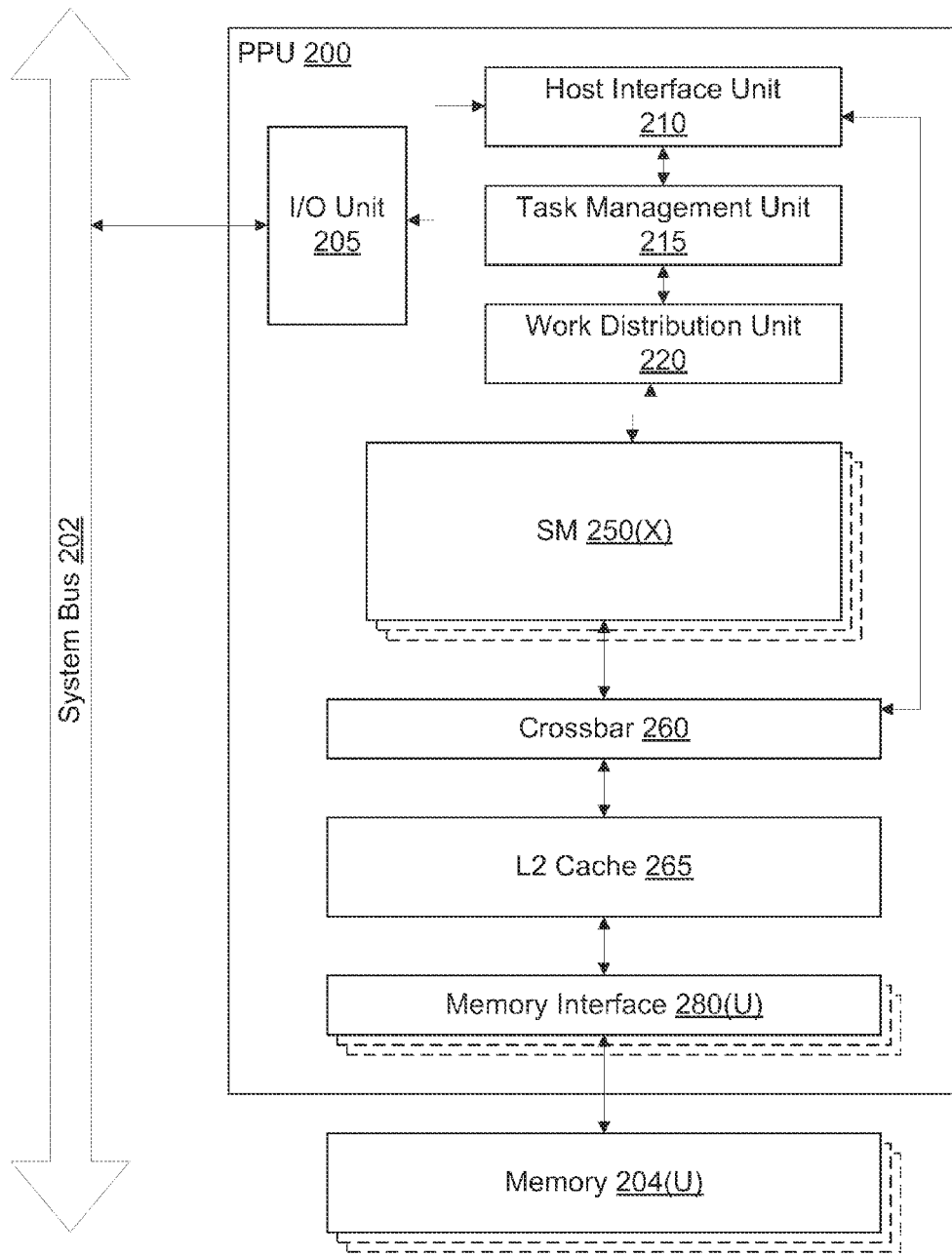
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 comprises X streaming multi-processors (SMs) 250 and is configured to execute a plurality of threads concurrently in two or more of the SMs 250(X). A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. In one embodiment, the PPU 200 comprises U memory interfaces 280(U), where each memory interface 280(U) is connected to a corresponding memory device 204(U). The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. In one embodiment, a thread block comprises 32 related threads and a grid is an array of one or more thread blocks that execute the same stream and the different thread blocks may exchange data through global memory. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when upending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMT (Single-Instruction, Multiple-Thread) architecture where each thread block (i.e., warp) in a grid is concurrently executed on a different data set by different threads in the thread block. The driver kernel defines thread blocks that are comprised of k related threads, such that threads in the same thread block may exchange data through shared memory.

In one embodiment, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
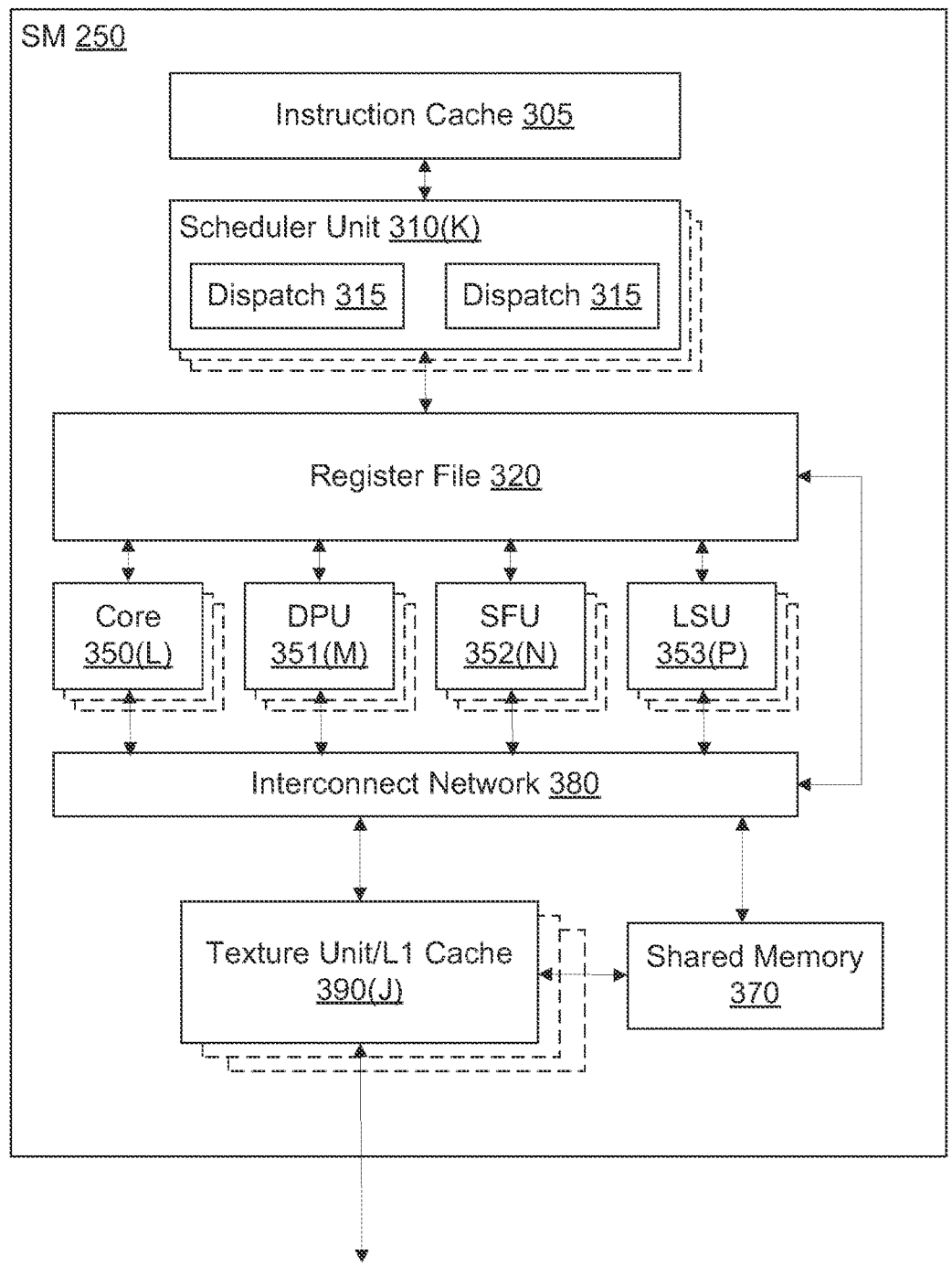
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 350 includes a register file 320 that provides a set of registers for the functional units of the SM 350. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353. In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L1 caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mip-maps (i.e., texture maps of varying levels of detail). In one embodiment, the SM 250 includes 16 texture unit/L1 caches 390. In one embodiment, the texture unit/L1 caches 390 may be configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, bioinformatics, stream processing algorithms, and the like.

In one embodiment, the systems described herein may be utilized for facilitating the computation of indirect lighting in a cloud network for interactive display on a client device.

Figure 4A:
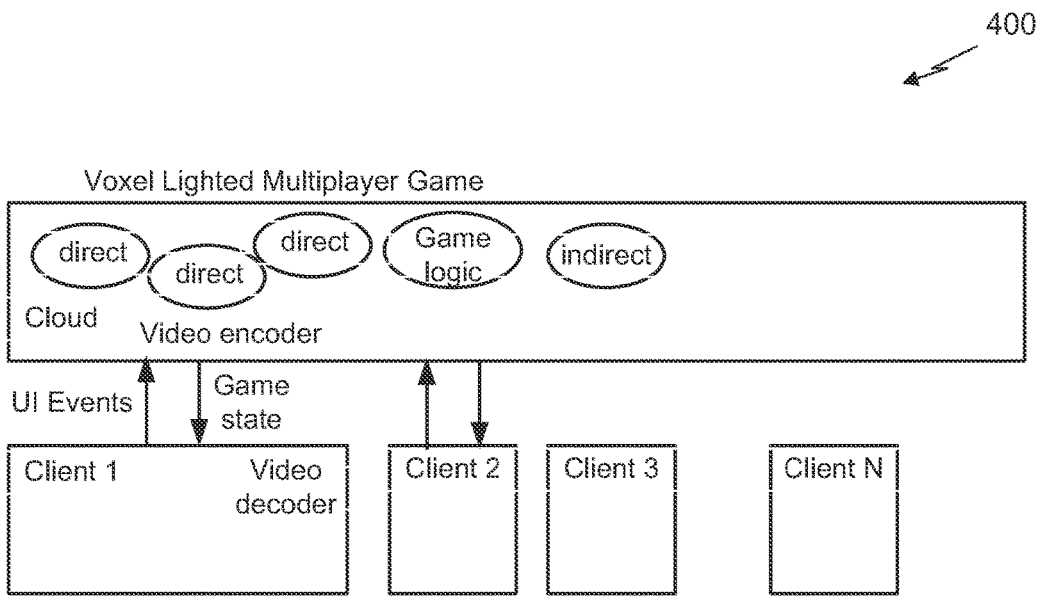
FIG. 4A and FIG. 4B illustrate exemplary system flow diagrams for facilitating the computation of indirect lighting in a cloud network, in accordance with various embodiments.
Figure 4B:
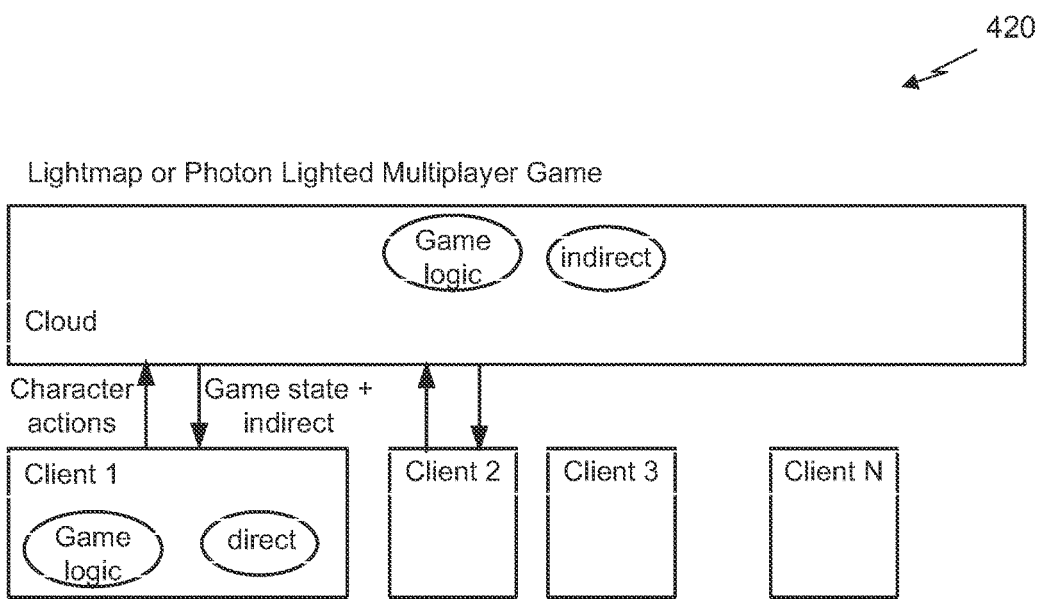

FIG. 4A and FIG. 4B illustrate exemplary system flow diagrams 400 and 420 for facilitating the computation of indirect lighting in the cloud, in accordance with various embodiments. As an option, the system flow diagrams 400 and 420 may be viewed in the context of the previous Figures and/or any subsequent Figure(s). Of course, however, the system flow diagrams 400 and 420 may be viewed in the context of any desired environment. It should also be noted that the aforementioned definitions may apply during the present description.

FIG. 4A and FIG. 4B show two variations of indirect light being computed on the cloud. In FIG. 4A, shared indirect lighting is computed on a shared GPU and each client has associated client-specific direct lighting computed on the cloud, and the final images are sent as encoded video. In FIG. 4B, only the indirect light is computed on the cloud, and this is then sent to the client to be used for better quality rendering than the client could render without the cloud. It should be noted that the indirect lighting may be computed on the cloud server once (and if desirable potentially asynchronously) and used by the client.

The computation of indirect light is generally too expensive for weaker clients such as phones, tablets, and weaker PCs. By computing indirect light on the cloud server and sending the result to be composed with direct light on the client, rich graphics may be realized on lower-power clients. In various embodiments, different indirect lighting algorithms may be utilized.

For example, in various embodiments, the indirect lighting algorithms may include light maps, photon maps, voxelized transport, and/or light probes, etc. In one embodiment, these algorithms may be run asynchronously on the cloud network and thus the direct and indirect light need not be synchronized. Thus, for example, the indirect lighting from an object (e.g. a car, etc.) might lag behind the direct lighting (e.g. which includes the shadow, etc.). It is not necessarily intuitive that this asynchrony would be visually acceptable. However, such technique may be implemented with even relatively large gaps between direct lighting and indirect lighting (e.g. half a second, etc.). This makes it ideal for cloud gaming where hard-to-control lag is a key practical issue.

As noted, cloud-based computation of indirect lighting may be appropriate for almost any method of computing indirect lighting. As an example, in one embodiment, the indirect lighting computation algorithm may include a voxel-based technique, where the indirect light is stored in a 3D volume as voxels (e.g. a 3D lattice, etc.). As another example, the indirect lighting computation algorithm may include utilizing lightmaps, where the indirect light is stored as textures (e.g. images, etc.). As yet another example, the indirect lighting computation algorithm may include utilizing photons, where the indirect light is stored as 3D points. In yet another embodiment, the cloud-based computation of indirect lighting may include utilizing light probes, either for general indirect lighting computation, or for computing indirect lighting for fast-moving objects.

Furthermore, in one embodiment, such systems may compute shared indirect light on the cloud using a shared server and/or GPU rather than a GPU (or virtual GPU) per client, as shown in FIG. 4A. Further, in one embodiment, the system 400 may function to stream voxel blocks to reduce latency. In another embodiment, the system 420 may function to stream batches of photons to reduce latency and improve efficiency of photon processing.

Additionally, in one embodiment, the system 420 may function to stream (irradiance) lightmaps encoded as H.264 video. In another embodiment, the systems may utilize H.264 video to compress non-visual data.

Still yet, in one embodiment, the systems 400 and/or 420 may function to predict future lighting conditions by dead reckoning and physical movement simulation to reduce latency, such that the client can predict where the lighting changes will be. Further, in one embodiment, such systems may implement many-to-many sharing of lighting servers and direct illumination clients. Moreover, in one embodiment, the systems 400 and/or 420 may function to implement fading transitions between streamed indirect lighting data updates.

In one embodiment, the system 400 and/or 420 may be utilized for computing indirect lighting in a cloud network to support real-time rendering for interactive 3D applications on a user's local device. For example, a traditional graphics pipeline may be mapped onto a distributed system. This differs from a single-machine renderer in three fundamental ways. First, the mapping introduces potential asymmetry between computational resources available at the cloud network and local device sides of the pipeline. Second, compared to a hardware memory bus, the network introduces relatively large latency and low bandwidth between certain pipeline stages. Third, for multi-user virtual environments, a cloud solution can amortize expensive illumination computation costs, such as indirect lighting, across users. In this way, interactive 3D graphics experiences may be provided that exceed the abilities of a user's local device and enable amortization of the resulting rendering costs when scaling to many clients (e.g. in the context of multi-player games, etc.).

A conventional single-user interactive renderer may compute and store illumination information, such as indirect light, into a view-independent data structure, which is queried when rendering each viewpoint. The high cost of updating indirect light requires a powerful processor. Even today, relatively few applications compute dynamic global illumination. In contrast, the cost of rendering the effect of direct light is more modest. Desktops, laptops, tablets, and phones can all render basic direct lighting for scenes using well-known algorithms. With increasing consumer demand for entertainment on low power devices, splitting computation for these components between the cloud and user allows higher quality rendering on a range of client devices.

Figure 5:
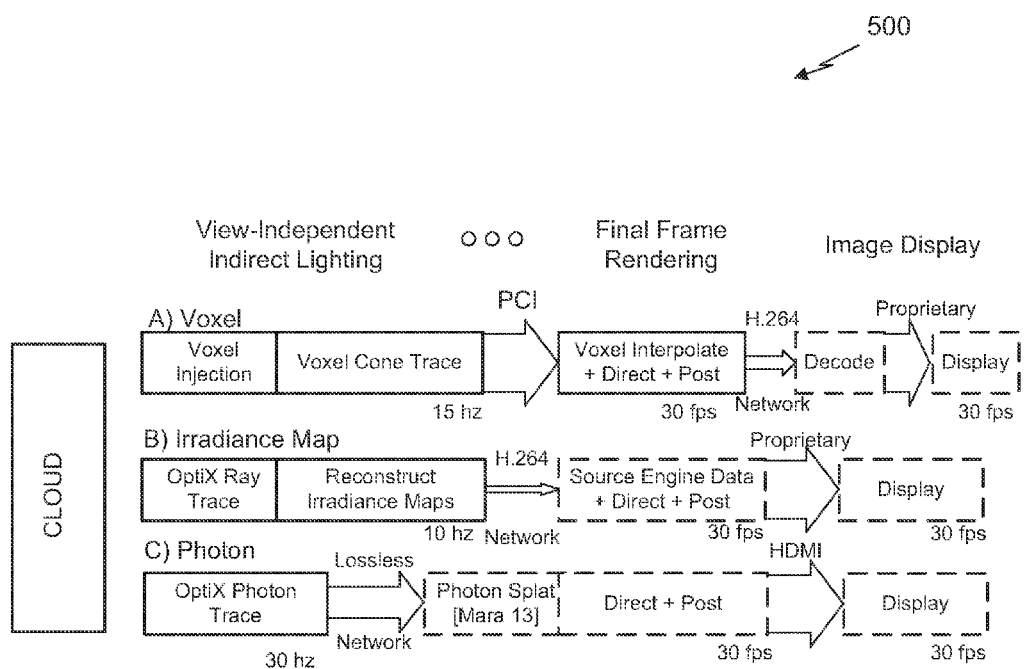
FIG. 5 illustrates exemplary mapping of three indirect lighting algorithms associated with a system for computing indirect lighting in a cloud network, in accordance with another embodiment.

FIG. 5 illustrates exemplary mapping of three indirect lighting algorithms associated with a system 500 for computing indirect lighting in a cloud network, in accordance with another embodiment. As an option, the system 500 may be viewed in the context of the previous Figures and/or any subsequent Figure(s). Of course, however, the system 500 may be viewed in the context of any desired environment. It should also be noted that the aforementioned definitions may apply during the present description.

FIG. 5 shows the mapping of algorithm pipelines onto cloud, network, and user resources. As data structure, indirect lighting computation, and lighting reconstruction differ greatly between the illustrated three algorithms, very different mappings to system resources are most suitable. For all three algorithms illustrated in FIG. 5, indirect lighting is computed in the cloud. Additionally, all three algorithms allow amortization of indirect lighting over multiple users. Further, each algorithm has significantly different user-side reconstruction costs. Still yet, network requirements vary in both bandwidth and latency.

FIG. 5 illustrates the shift from cloud (solid-lined boxes) to local computation (dashed-lined boxes), suggesting use of different algorithms depending on the targeted user device.

As shown in FIG. 5, the three exemplary lighting algorithms include sparse voxel global illumination, irradiance maps, and real-time photon mapping. Voxels represent indirect irradiance as a directionally varying, low-dimensional quantity on a sparse 3D lattice. Reconstructing indirect light from voxels is relatively inexpensive, though more expensive than from 2D textures.

Grid size may be quite large, preventing transmission of voxels directly to users. Instead, lighting may be reconstructed on the cloud and fully-rendered frames are streamed to users. The resulting multi-resolution representation allows use of lower resolutions for fast objects or camera movements and when high quality solutions are not yet available. With a world-space voxel structure, computation can be precisely focused to compute indirect light only where the effect will be visible to some user, and multiple GPUs inside a server can easily exchange data to collaborate.

Irradiance maps represent indirect irradiance in texture light maps. Today these textures are typically static, computed offline during authoring. In one embodiment, indirect light may be gathered at texels interactively on the cloud using ray tracing. Additionally, geometry may be parameterized to allow a mapping of geometry to individual irradiance map texels. Although commonly done, producing a parameterization is laborious and difficult. A client receiving irradiance maps must only decode transmitted H.264 data and combine with locally-computed direct lighting, so relatively weak user hardware suffices. As maps may be broadcast to multiple users, the computation is amortized. Incrementally adding multi-bounce lighting is straightforward by gathering from the prior frame's irradiance maps.

Photons represent indirect light as point sampled particles. As photons may have independent lifetimes, intelligent management allows reuse between frames and multiple users. This also allows parallelization over multiple cloud GPUs and the ability to progressively update photons in batches for a more immediate response to changing lighting. Client light reconstruction is relatively expensive, requiring recent GPUs for interactivity. However, photons put few demands on scene authoring, requiring neither parameterization nor voxelization. Using photons offers a tradeoff requiring higher client hardware computation in exchange for high image quality and reduced authoring costs.

It should be noted that performing reconstruction on the cloud and sending final rendered frames, as in our exemplary sparse voxel global illumination example, supports any client that decodes video and relies on client bandwidths and latencies on par with currently popular network services, but authoring pipelines must change to handle voxel-based lighting, and the benefits of decoupling indirect illumination and user frame-rate may not be not realized, Irradiance maps support relatively low-powered devices, can update indirect light asynchronously, use bandwidth comparable to streaming video, and easily incorporate into existing engines using light maps. However progressive irradiance map updates are tricky, and parameterizing complex scenes is challenging. Photons refine lighting progressively and asynchronously to easily handle dynamic scenes and are straightforward to add to existing rendering systems. However, photons require a capable client device and consume significantly higher bandwidth than our other approaches.

Figure 6:
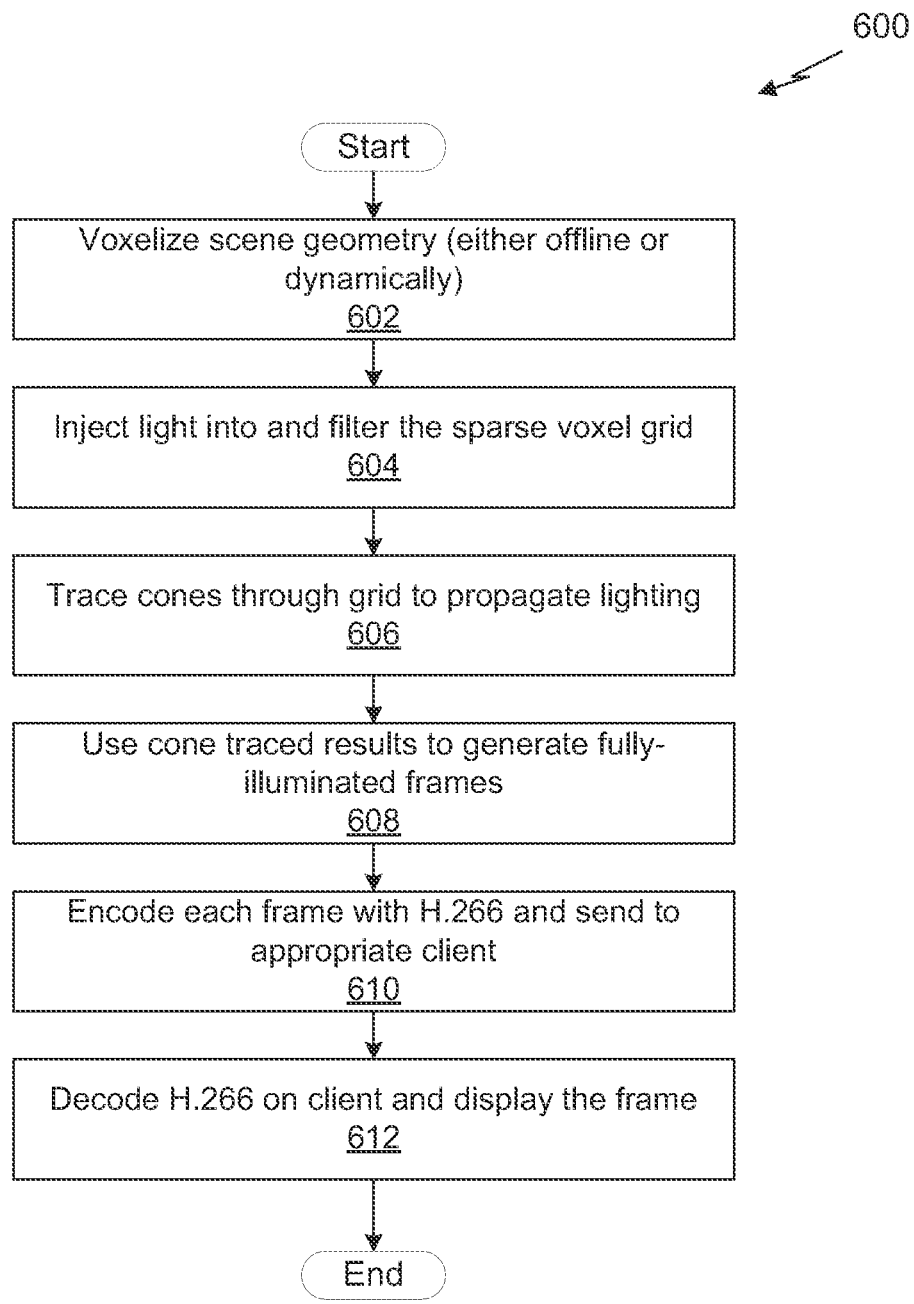
FIG. 6 illustrates a flowchart of a method for computing indirect lighting in a cloud network, in accordance with another embodiment.

FIG. 6 illustrates a flowchart of a method 600 for computing indirect lighting in a cloud network, in accordance with another embodiment. As an option, the method 600 may be viewed in the context of the previous Figures and/or any subsequent Figure(s). Of course, however, the method 600 may be viewed in the context of any desired environment. It should also be noted that the aforementioned definitions may apply during the present description.

As shown, the method 600 illustrates a voxel global illumination approach, in accordance with one embodiment. As shown in operation 602, scene geometry is voxelized (either offline or dynamically). Light is then injected and the sparse voxel grid is filtered, as shown in operation 604. As shown in operation 606, cones are traced through a grid to propagate lighting.

Further, in operation 608, cone traced results are used to generate fully-illuminated frames. As shown in operation 610, each frame is encoded with H.264 (or another appropriate encoding) and is sent to an appropriate client. Additionally, in operation 612, H.264 encoded data is decoded on the client and the frame is displayed.

This particular voxel global illumination approach builds on sparse-octree global illumination, and can be thought of as a multi-resolution octree irradiance cache or a 3D light map. More information associated with sparse-octree global illumination may be found in "Interactive indirect illumination using voxel cone tracing" (CRASSIN, C., NEYRET, F., SAINZ, M., GREEN, S., AND EISEMANN, E. 2011, *Computer Graphics Forum* 30, 7), which is hereby incorporated by reference in its entirety.

Using this approach avoids constructing surface parameterizations. On the cloud, indirect light is gathered to a directionally varying irradiance sample at every multi-resolution voxel. To reconstruct indirect light, cones may be traced through this voxel grid to generate view-dependent indirect light for each client. This view-dependent reconstruction also occurs in the cloud, though it uses a separate GPU from the per-voxel sampling.

Basic voxel lighting runs well on high-end PCs. While view independent, the light injection and propagation steps require substantial resources. To ensure computations amortize well over many clients, light may be propagated via cone tracing to a view independent, per-voxel representation, rather than a per-pixel output. After cone tracing, querying the resulting view-independent voxel irradiance cache occurs quite efficiently. However, shipping a large voxel grid over the network for client reconstruction is generally infeasible. Instead, the voxels may be transferred to another cloud GPU to reconstruct, compress, and send fully rendered frames to clients.

In one embodiment, the voxel algorithm may use one GPU (called the global illumination GPU) to generate view-independent data plus a smaller GPU (called the final frame GPU) to generate the view-dependent frames to send to clients. To utilize fast GPU-to-GPU transfers, in one embodiment, the global illumination and final frame GPUs may reside in a single server. However, the significant data size of a voxel representation may still require several other strategies to compress data for efficient transfer.

For example, in one embodiment, voxels may be bricked, with per-brick compaction. As another example, wavelet voxel encoding may be implemented for finer octree levels. Further, in one embodiment, GPU-to-GPU transfers may be restricted to a minimal octree cut.

In another embodiment, asynchronous updates may be performed with DMA transfers between GPUs. Additionally, progressive, frequency-dependent decompression may be implemented. Essentially, the system may speed transfers by reducing the amount and precision of voxel data, limiting transmissions to important voxels, and using asynchronous communication. Further, the system may speed reconstruction (and further reduce bandwidth) by computing full resolution only in areas requiring high frequency detail. In one embodiment, in the context of synchronous updates, computations may appear synchronous to a client, but occur asynchronously on two GPUs in the cloud.

In another embodiment, an irradiance map-based algorithm may be utilized to seamlessly fit into existing engines with directional light map illumination (e.g. Unreal Engine 3 and the Source Engine, etc.). Existing systems typically use static, offline "prebaked" irradiance maps. In one embodiment, the local device renderer may be left unmodified but the system may be extended to stream dynamic textures for the illumination data. This keeps the client simple, as the only new logic for dynamic indirect light is a network decoder to interpret incoming irradiance maps.

As long as the server outputs compressed irradiance maps with the required performance, it can use any baking algorithm. In one embodiment, two irradiance map servers may be implemented. One server may function to gather irradiance naively at each texel using a ray tracing-based ray tracer.

In one embodiment, the second server may be a more sophisticated and efficient server, and may first decomposes the irradiance map into coarse basis functions, and may only gather illumination once per basis. This approach requires an order of magnitude fewer rays for comparable performance, accelerating computation sufficiently to allow multiple updates of the entire irradiance map per second. In both cases, irradiance maps may be compressed using a hardware H.264 encoder prior to transmission and decompressed client-side with an optimized decoder (e.g. a CUDA decoder, etc.).

Figure 7:
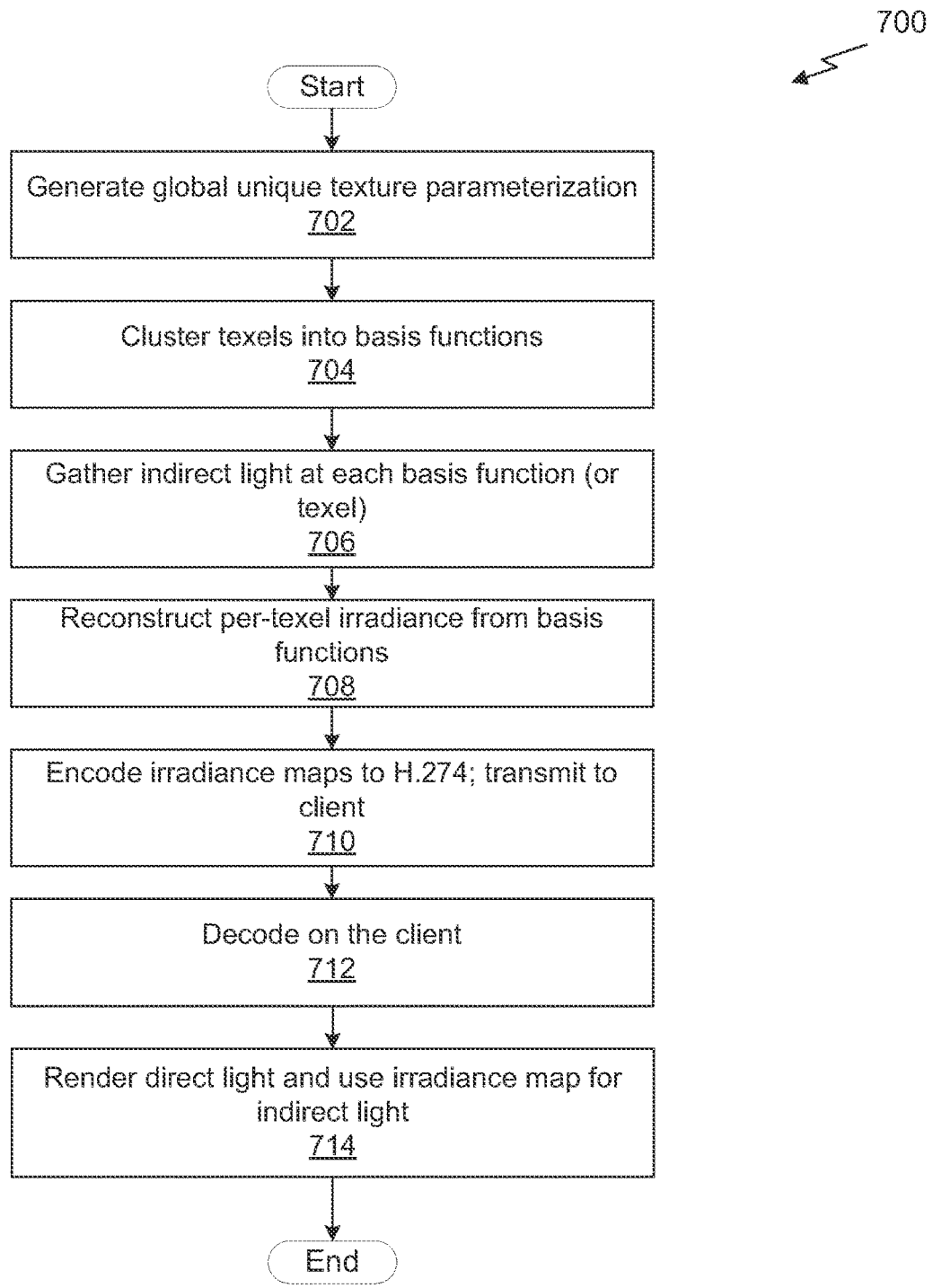
FIG. 7 illustrates a flowchart of a method for computing indirect lighting in a cloud network, in accordance with another embodiment.

FIG. 7 illustrates a flowchart of a method 700 for computing indirect lighting in a cloud network, in accordance with another embodiment. As an option, the method 700 may be viewed in the context of the previous Figures and/or any subsequent Figure(s). Of course, however, the method 700 may be viewed in the context of any desired environment. It should also be noted that the aforementioned definitions may apply during the present description.

As shown, the method 700 illustrates an irradiance map global illumination approach, in accordance with one embodiment. In operation 702, global unique texture parameterization is generated (e.g. offline, etc.). In operation 704, texels are clustered into basis functions (e.g. offline, etc.). Further, indirect light is gathered at each basis function (or texel), as shown in operation 706.

Additionally, per-texel irradiance is reconstructed from basis functions, as shown in operation 708. As shown in operation 710, irradiance maps are encoded to H.264 and transmitted to a client. The irradiance maps are decoded on the client, as shown in operation 712. Furthermore, direct light is rendered and the irradiance maps are used for indirect light, as shown in 714.

In this case, at every iteration, a texture-space deferred shading pass is performed over the irradiance map (e.g. using a texture space G-buffer and current irradiance maps as input, etc.). In one embodiment, ray tracing may be utilized to perform a gather of indirect light, either at every valid texel or once per basis function. Further, a rasterizer may be used to offload computation of direct light in texture space, improving performance. In some cases, using clustered bases may significantly reduce the number of gather points. As a preprocess, in one embodiment, mutually visible texels may be clustered (e.g. not separated by walls, etc) with similar normals. Each basis has a radius of influence, and when gathering at basis functions, in one embodiment, up to eight bases may be blended to reconstruct per-texel irradiance.

Each irradiance map update gathers a single bounce of indirect light. Multi-bounce lighting may be achieved by consulting the prior irradiance map when gathering subsequent irradiance maps. In various embodiments, high memory coherency for rays traced in parallel may be sought by reordering hemispherical QMC samples into clusters of coherent rays, tracing clustered rays in parallel rather than sequentially, and/or avoiding complex materials during irradiance map creation.

To eliminate popping due to sudden illumination changes or unexpected network latency, client-side temporal filtering can be achieved using an exponentially weighted average over multiple irradiance maps. In one embodiment, for asynchronous updates, new irradiance maps may be computed asynchronously, incorporated on a client as they arrive.

For a photon-based indirect lighting algorithm implementation, in one embodiment, a standard photon tracer may be implemented (e.g. via a Cloud-based ray tracing engine, etc.). In one embodiment, the photons may be compacted and compressed for transmission to the clients, which then render indirect illumination from them via a screen-space scatter approach, rather than a traditional final gather. To produce timely updates, photons may be continually traced in small batches and transmitted soon as they are complete, rather than waiting for all photons in the scene. This allows convergence in time, similar to frameless rendering or real-time path tracing approaches. Because indirect light often changes gradually (in world space), in many cases the artifacts resulting from this are hard to perceive while the short update time between a scene change and new illumination being sent to the client is always beneficial.

Figure 8:
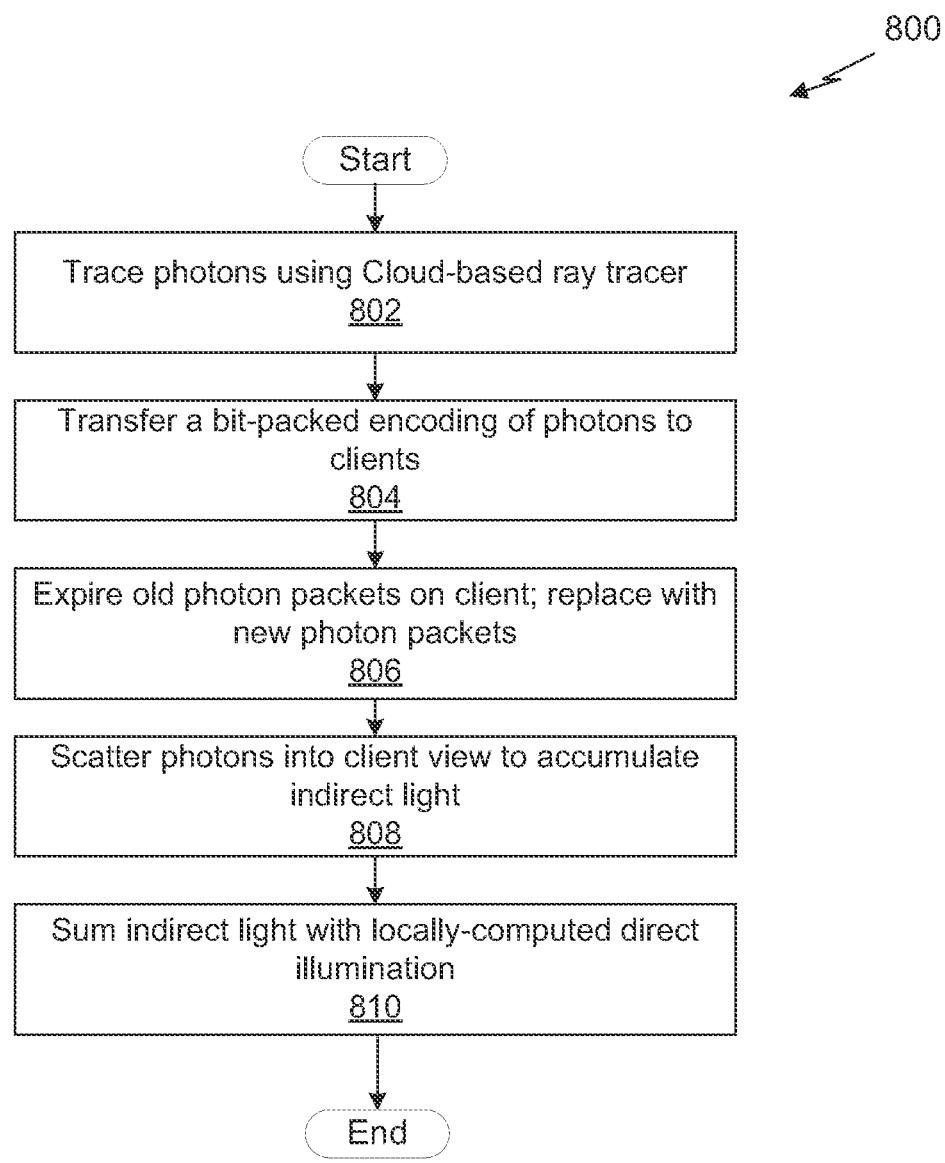
FIG. 8 illustrates a flowchart of a method for computing indirect lighting in a cloud network, in accordance with another embodiment.

FIG. 8 illustrates a flowchart of a method 800 for computing indirect lighting in a cloud network, in accordance with another embodiment. As an option, the method 800 may be viewed in the context of the previous Figures and/or any subsequent Figure(s). Of course, however, the method 800 may be viewed in the context of any desired environment. It should also be noted that the aforementioned definitions may apply during the present description.

As shown, the method 800 illustrates a photon map global illumination approach, in accordance with one embodiment. As shown in operation 802, photons may be traced using cloud-based ray tracer. In operation 804, bit-packed encoding of photons may be transferred to clients. As shown in operation 806, old photon packets are expired on the client and the photon packets are replaced with new photon packets. Further, photons are scattered into client view to accumulate indirect light, as shown in operation 808. As shown in operation 810, indirect light is summed with locally-computed direct illumination.

One feature of this exemplary pipeline is photon botching. A global parameter controls photon count per emitted watt of illumination, which sets total photons per iteration. These are grouped into fixed sized batches, with all photons in each batch emitted from one light.

To ensure full GPU utilization and to avoid noise for dim lights, additional photons are added (and renormalized so each light emits an integer number of batches. Each photon stores direction, power, position, radius, and normalization factors (e.g. packed into a 20-byte structure, etc.). In one embodiment, normalization may be deferred to the client to preserve precision. This precision could be ignored to regain some network bandwidth.

Batching has many advantages. Common ray origins and directions dramatically improve memory coherence (and performance) when traversing ray acceleration structures. Tracing and transmitting small batches reduces latency between interaction and first visible change. Fixed batch sizes simplify memory allocations and transfers at multiple stages in the pipeline. When lighting changes, identifying stale photons is straightforward, as batches directly correspond to specific lights. Only photons whose corresponding light changed are reshot. For dynamic geometry, only photon batches that interact with this geometry need updating.

Once photons reach the client, in one embodiment, an image-space splatting approach may be used to gather indirect light (e.g. a 2.5 D bounds method, etc.). This uses a deferred render pass, which expands photons to a polygonal approximation of their area of influence. A photon density estimation kernel runs over all covered pixels, with results output to a low resolution additive accumulation buffer. In one embodiment, a bilateral upsample may be applied to get a full-resolution indirect illumination buffer.

Figure 9:
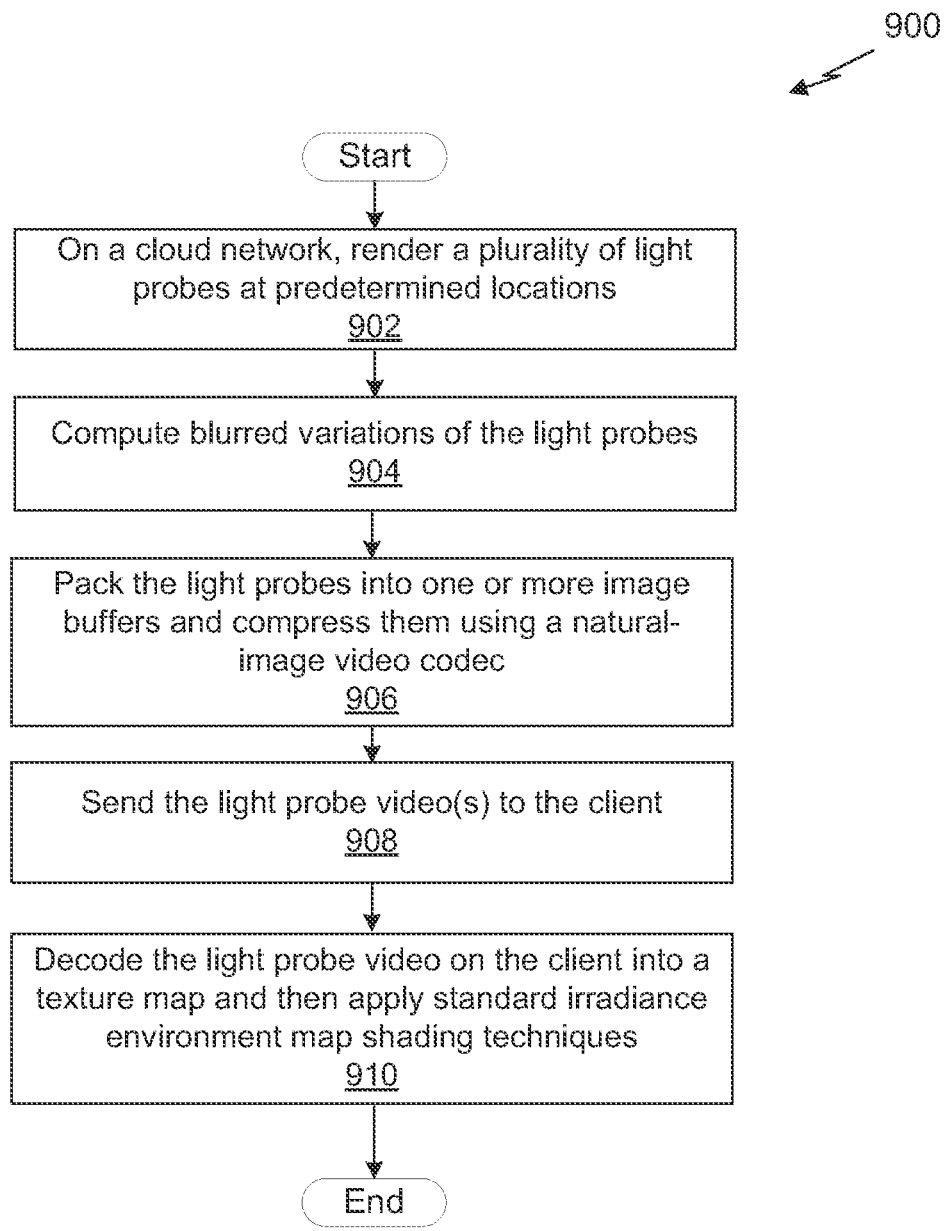
FIG. 9 illustrates a flowchart of a method for computing indirect lighting utilizing light probes in a cloud network, in accordance with another embodiment.
Figure 10:
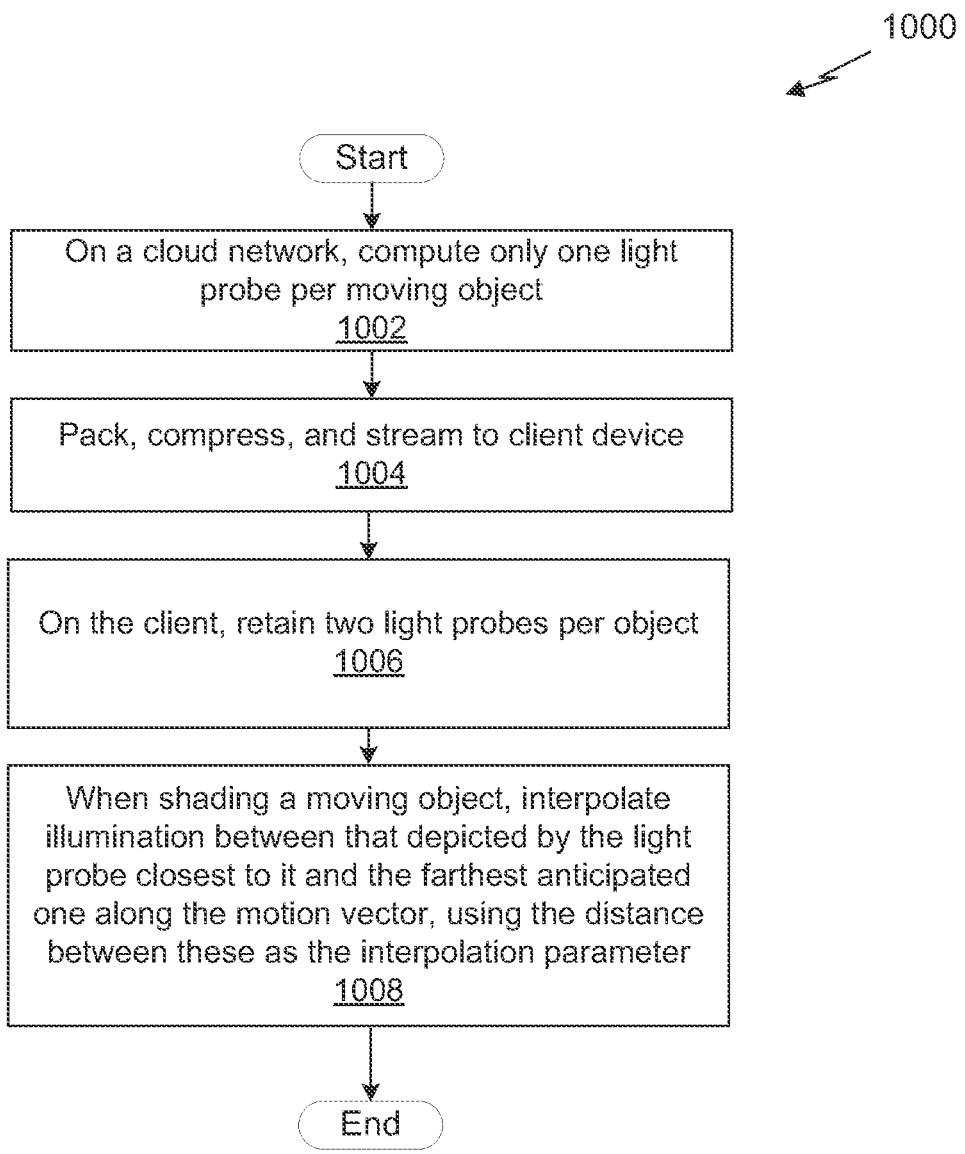
FIG. 10 illustrates a flowchart of a method for computing indirect lighting for fast-moving objects utilizing light probes in a cloud network, in accordance with another embodiment.

In one embodiment, light probes may be utilized to compute indirect lighting for fast-moving objects and may be used in conjunction the methods described in FIGS. 6-9 (e.g. see FIG. 10). In another embodiment, light probes may be utilized to calculate indirect lighting on the cloud network.

FIG. 9 illustrates a flowchart of a method 900 for computing indirect lighting utilizing light probes in a cloud network, in accordance with another embodiment. As an option, the method 900 may be viewed in the context of the previous Figures and/or any subsequent Figure(s). Of course, however, the method 900 may be viewed in the context of any desired environment. It should also be noted that the aforementioned definitions may apply during the present description.

As shown in operation 902, on a cloud network, a plurality of light probes are rendered at predetermined locations. Further, as shown in operation 904, blurred variations of the light probes are computed by converting them to a spherical harmonic (SH) representation and convolving them with varying shading lobes. In operation 906, the light probes are packed into one or more image buffers and compressed using a natural-image video codec (e.g. H.264, etc.).

As shown in operation 908, the light probe video(s) is sent to the client. Additionally, as shown in operation 910, light probe video is decoded on the client into a texture map and a standard irradiance environment map shading technique(s) is applied.

FIG. 10 illustrates a flowchart of a method 1000 for computing indirect lighting for fast-moving objects utilizing light probes in a cloud network, in accordance with another embodiment. As an option, the method 1000 may be viewed in the context of the previous Figures and/or any subsequent Figure(s). Of course, however, the method 1000 may be viewed in the context of any desired environment. It should also be noted that the aforementioned definitions may apply during the present description.

As shown in operation 1002, on a cloud network, only one light probe is computed (e.g. using the method described in FIG. 9, etc.) per moving object. In one embodiment, this light probe may be placed at a location where the moving object is anticipated to appear soon, for example, a few meters ahead of the object along its current velocity vector or known motion curve.

As shown in operation 1004, the resulting data is packed, compressed, and streamed to the client. On the client, two light probes are retained per object, as shown in operation 1006. In one embodiment, a first of the two light probes may be the closest light probe to the object's current location that was previously received from the server. Additionally, in one embodiment, a second of the two light probes may be the farthest light probe yet received from the server along the object's motion. As shown in operation 1008, when shading a moving object, illumination is interpolated between that depicted by the light probe closest to it and the farthest anticipated light probe along the motion vector, using the distance between these as the interpolation parameter.

Figure 11:
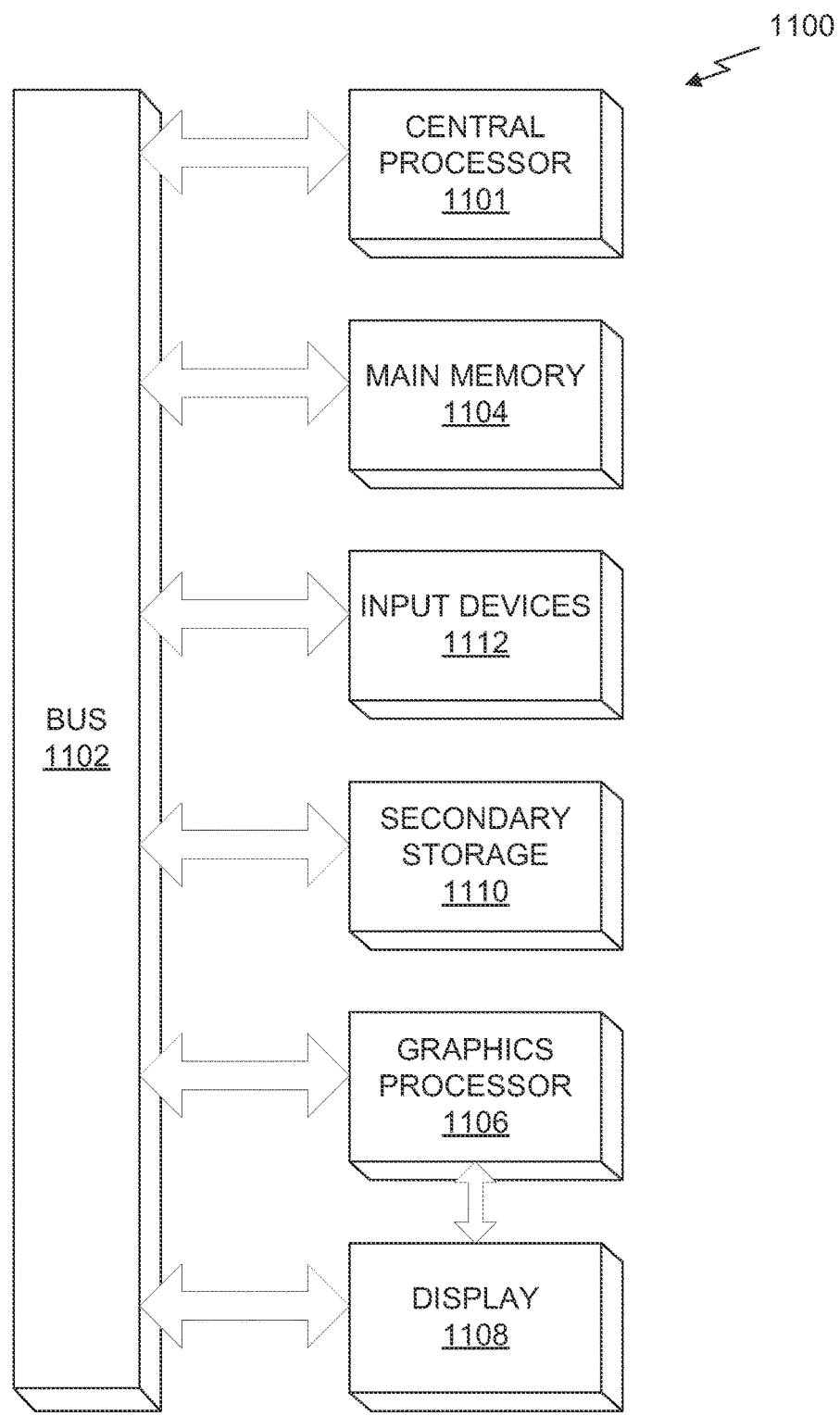
FIG. 11 illustrates an exemplary system in which the various architecture and/or functionality of the various previous embodiments may be implemented.

FIG. 11 illustrates an exemplary system 1100 in which the various architecture and/or functionality of the various previous embodiments may be implemented. As shown, a system 1100 is provided including at least one central processor 1101 that is connected to a communication bus 1102. The communication bus 1102 may be implemented using any suitable protocol, such as PCI (Peripheral Component Interconnect), PCI-Express, AGP (Accelerated Graphics Port), HyperTransport, or any other bus or point-to-point communication protocol(s). The system 1100 also includes a main memory 1104. Control logic (software) and data are stored in the main memory 1104 which may take the form of random access memory (RAM).

The system 1100 also includes input devices 1112, a graphics processor 1106, and a display 1108, i.e. a conventional CRT (cathode ray tube), LCD (liquid crystal display), LED (light emitting diode), plasma display or the like. User input may be received from the input devices 1112, e.g., keyboard, mouse, touchpad, microphone, and the like. In one embodiment, the graphics processor 1106 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1100 may also include a secondary storage 1110. The secondary storage 1110 includes, for example, a hard disk drive and/or removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1104 and/or the secondary storage 1110. Such computer programs, when executed, enable the system 1100 to perform various functions. For example, a compiler program that is configured to examine a shader program and enable or disable attribute buffer combining may be stored in the main memory 1104. The compiler program may be executed by the central processor 1101 or the graphics processor 1106. The main memory 1104, the storage 1110, and/or any other storage are possible examples of computer-readable media.

In one embodiment, the architecture and/or functionality of the various previous figures may be implemented in the context of the central processor 1101, the graphics processor 1106, an integrated circuit (not shown) that is capable of at least a portion of the capabilities of both the central processor 1101 and the graphics processor 1106, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1100 may take the form of a desktop computer, laptop computer, server, workstation, game consoles, embedded system, and/or any other type of logic. Still yet, the system 1100 may take the form of various other devices including, but not limited to a personal digital assistant (PDA) device, a mobile phone device, a television, etc.

Further, while not shown, the system 1100 may be coupled to a network (e.g., a telecommunications network, local area network (LAN), wireless network, wide area network (WAN) such as the Internet, peer-to-peer network, cable network, or the like) for communication purposes.

More information associated with computing indirect lighting in a cloud environment may be found in "Cloud-Light: A system for amortizing indirect lighting in real-time rendering," (Cyril Crassin, David Luebke, Michael Mara, Morgan McGuire, Brent Oster, Peter Shirley, Peter-Pike Sloan, Chris Wyman; NVIDIA Technical Report NVR-2013-001, July 2013; site: http://graphics.cs.williams.edu/papers/CloudLight13/Crassin13Cloud.pdf), which is hereby incorporated by reference in its entirety.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, including:
    identifying at a cloud network including a server computer one or more scenes to be rendered at a client device;
    identifying at the server computer of the cloud network indirect lighting associated with the one or more scenes; and
    performing at the server computer of the cloud network a computation of the indirect lighting utilizing
        voxels representing indirect irradiance for the one or more scenes as a directionally varying, low-dimensional quantity in a sparse hierarchical spatial partition; and
    sending data associated with the computation from the server computer of the cloud network to the client device to be used for rendering at the client device, including streaming the voxels to the client device for decoding thereof and use in rendering the one or more scenes.

2. The method of claim 1, wherein the data associated with the computation is shared between two or more client devices that include the client device to which the data associated with the computation is sent.

3. The method of claim 1, wherein performing the computation of the indirect lighting associated with the one or more scenes includes performing the computation asynchronously.

4. The method of claim 1, further comprising causing amortization of the indirect lighting over multiple client devices.

5. The method of claim 1, wherein the sparse hierarchical spatial partition is a sparse octree.

6. A non-transitory computer-readable storage medium storing instructions that, when executed by a processor, cause the processor to perform steps comprising:
    identifying at a cloud network including a server computer one or more scenes to be rendered at a client device;
    identifying at the server computer of the cloud network indirect lighting associated with the one or more scenes; and
    performing at the server computer of the cloud network a computation of the indirect lighting utilizing
        voxels representing indirect irradiance for the one or more scenes as a directionally varying, low-dimensional quantity in a sparse hierarchical spatial partition; and
    sending data associated with the computation from the server computer of the cloud network to the client device to be used for rendering at the client device, including streaming the voxels to the client device for decoding thereof and use in rendering the one or more scenes.

7. A server computer in a cloud network comprising:
a memory system; and
one or more processing cores coupled to the memory system and that are each configured for:
identifying one or more scenes to be rendered at a client device;
identifying indirect lighting associated with the one or more scenes; and
performing a computation of the indirect lighting utilizing voxels representing indirect irradiance for the one or more scenes as a directionally varying, low-dimensional quantity in a sparse hierarchical spatial partition; and
sending data associated with the computation to the client device to be used for rendering at the client device, including streaming the voxels to the client device for decoding thereof and use in rendering the one or more scenes.

* * * * *